United States Patent
Kress et al.

[11] Patent Number: 5,478,179
[45] Date of Patent: Dec. 26, 1995

[54] REAMER TIP

[75] Inventors: Dieter Kress, Aalen; Friedrich Häberle, Lauchheim, both of Germany

[73] Assignee: MAPAL Fabrik für Präzisionswerkzeuge Dr. Kress KG, Aalen, Germany

[21] Appl. No.: 392,719

[22] Filed: Feb. 23, 1995

[30] Foreign Application Priority Data

Feb. 23, 1994 [DE] Germany .................. 44 05 749.0

[51] Int. Cl.$^6$ .................................................. B23B 51/00
[52] U.S. Cl. .................... 408/199; 407/113; 408/227; 408/713; 408/83
[58] Field of Search .................... 408/199, 231–233, 408/713, 83, 223, 224, 227; 407/113–116

[56] References Cited

U.S. PATENT DOCUMENTS

| | | | |
|---|---|---|---|
| 4,125,342 | 11/1978 | Kress | 408/179 |
| 4,279,550 | 7/1981 | Kress et al. | 408/197 |
| 4,850,757 | 7/1989 | Stashko | 408/179 |

*Primary Examiner*—Steven C. Bishop
*Attorney, Agent, or Firm*—Anderson Kill Olick & Oshinsky

[57] ABSTRACT

A reamer tip including a main cutting edge and a auxiliary cutting edge adjoining the first main cutting edge; and a flank provided in a region of the main and auxiliary cutting edges and including a first inclined flank region having a first back angle of about 7°, and a second inclined flank region directly adjoining the auxiliary cutting edge, extending from the auxiliary cutting edge to the first flank region, and having a second back angle substantially smaller than the first back angle.

12 Claims, 6 Drawing Sheets

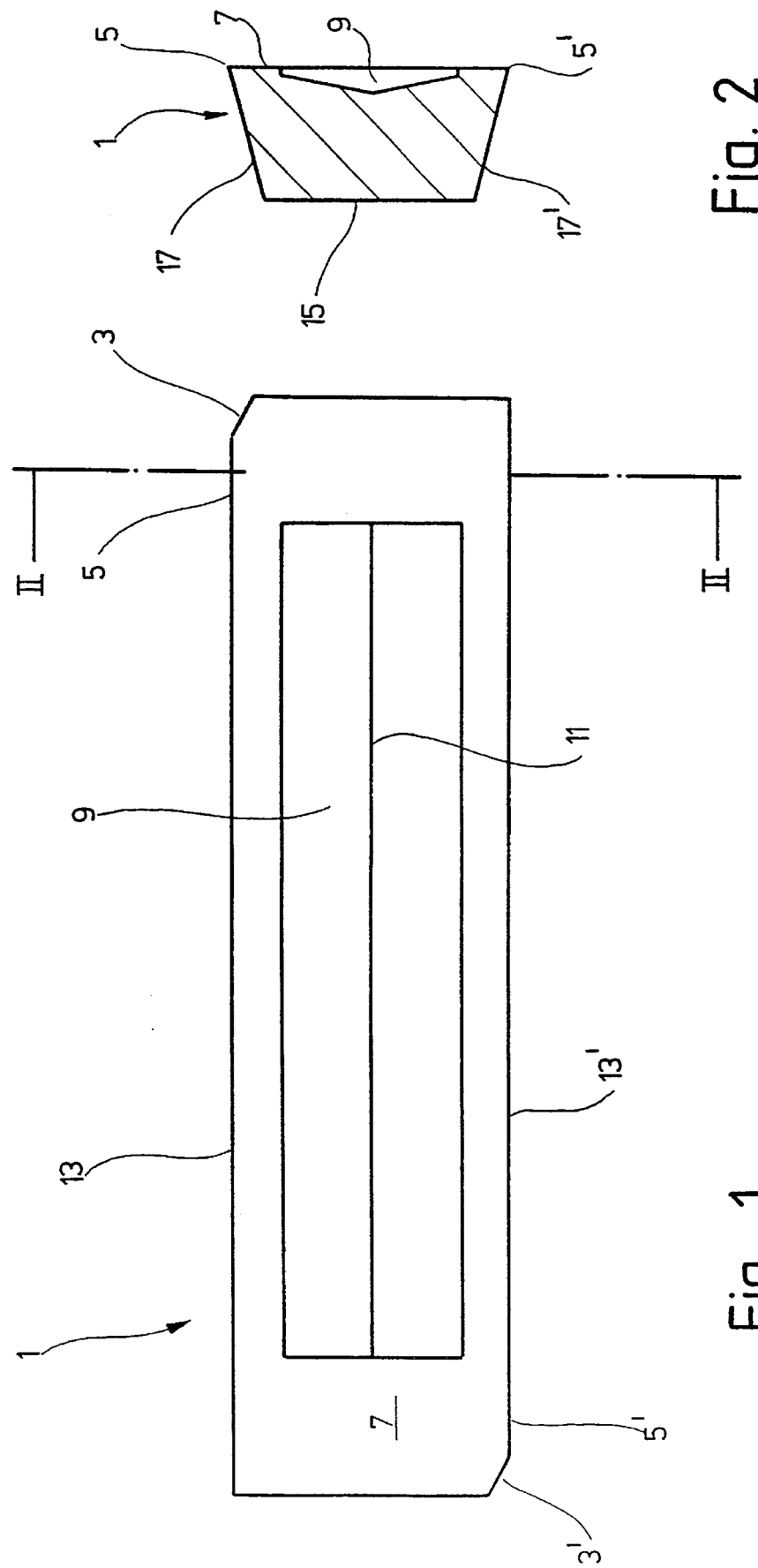

REAMER TIP

BACKGROUND OF THE INVENTION

The present invention relates to a reamer tip including main and auxiliary cutting edges and a flank, which is provided in the region of the main and auxiliary cutting edges and has an inclined flank region with a back angle of about 7°.

As known, reamers having tips of the above-described type serve for finish machining bore surfaces to obtain a very precise bore geometry, together with a high quality bore surface. The reamers of the above-described type usually have two guides, with the tip being secured in a groove provided in a reamer circumference. The main and auxiliary cutting edges, which engage the bore wall, project somewhat further from the outer surface of the reamer than outer surfaces of the guides. This arrangement is designed to prevent action of high pressure forces on the outer surfaces of the guides, so that they would not damage the machined bore wall but would still insure an optimal guidance of the reamer in the bore.

It is well known that, during machining of a bore surface, the tip is subjected to so-called initial wear when the ream is first inserted into the machined bore, and that the initial wear is significantly higher than the subsequent wear. Therefore, it becomes necessary to adjust the projection of the tip from the reamer circumference after a certain time in order to compensate for the initial wear and to obtain the predetermined bore size.

During the first machining of a bore surface, the tip extends further away from the reamer circumference than the guide outer surfaces, and further than after the initial wear of the cutting edges. This results in a relatively non-uniform guidance of the reamer in the machined bore, so that the geometrical characteristics, e.g., the roundness and the surface quality of the bore do not meet the predetermined requirements. Because of the large initial wear, particularly high bore characteristics are difficult to obtain and a complicated adjustment of the operational diameter of a reamer is required. That leads to increased costs of production.

Accordingly, the object of the invention is to provide a reamer tip that would permit to eliminate the above-listed drawbacks and, in particular, would reduce the initial wear to that which takes place later.

SUMMARY OF THE INVENTION

This and other objects of the invention, which will become apparent hereinafter, are achieved by forming the flank with a second flank region that adjoins the auxiliary cutting edge, extends between the auxiliary cutting edge and the first flank region, and has a back angle significantly smaller than the back angle of the first flank region. Providing a second flank region that directly adjoins the auxiliary cutting edge results in providing in the region of the auxiliary cutting edge of an additional guide surface, so that the reamer is also supported in this region against the bore wall. This results in a smooth and uniform displacement of the reamer in the bore, which in turn insures uniform wear of the tip during machining of the bore. In this way, the high initial wear, which occurs when conventional reamer tips are used, is practically eliminated. Further, this eliminates the need in the adjustment of the operational diameter of the reamer that is required with conventional reamers.

Advantageously, the second back angle of the second flank region is selected to be about 1°. That means that the flank is inclined in a direction, which is opposite to the direction of rotation of the reamer, at 1°. In this way, the second flank region serves as an additional reamer guide.

The width of the second flank region taken in a direction transverse to the extent of the auxiliary cutting edge is advantageously selected in the range of 0.06–0.1 mm, and preferably is 0.8 mm. The selected width of the second flank region prevents the application of any significant pressure forces to the reamer in this region.

Advantageously, the tip according to the present invention is formed as a reversible tip. Such form of the tip permits repeated use of the tip which, upon wear of the first cutting edges, is rotated by 180°, so that machining can be effected with second main and auxiliary cutting edges, not used previously.

Finally, the tip according to the present invention may be formed as a polygon, e.g., hexagon, so that there are provided six pairs of main and auxiliary cutting edges. This insures an economical use of rather expensive materials from which the reamer tips are usually formed.

BRIEF DESCRIPTION OF THE DRAWINGS

The features and objects of the present invention will become more apparent, and the invention itself will be best understood from the following detailed description of the preferred embodiments when read with reference to the accompanying drawings, wherein:

FIG. 1 is a top view of a face of a first embodiment of a reamer tip according to the present invention;

FIG. 2 is a cross-section view along line II—II in FIG. 1;

DETAILED DESCRIPTION OF THE PREFERRED EMBODIMENT

Figure 3:
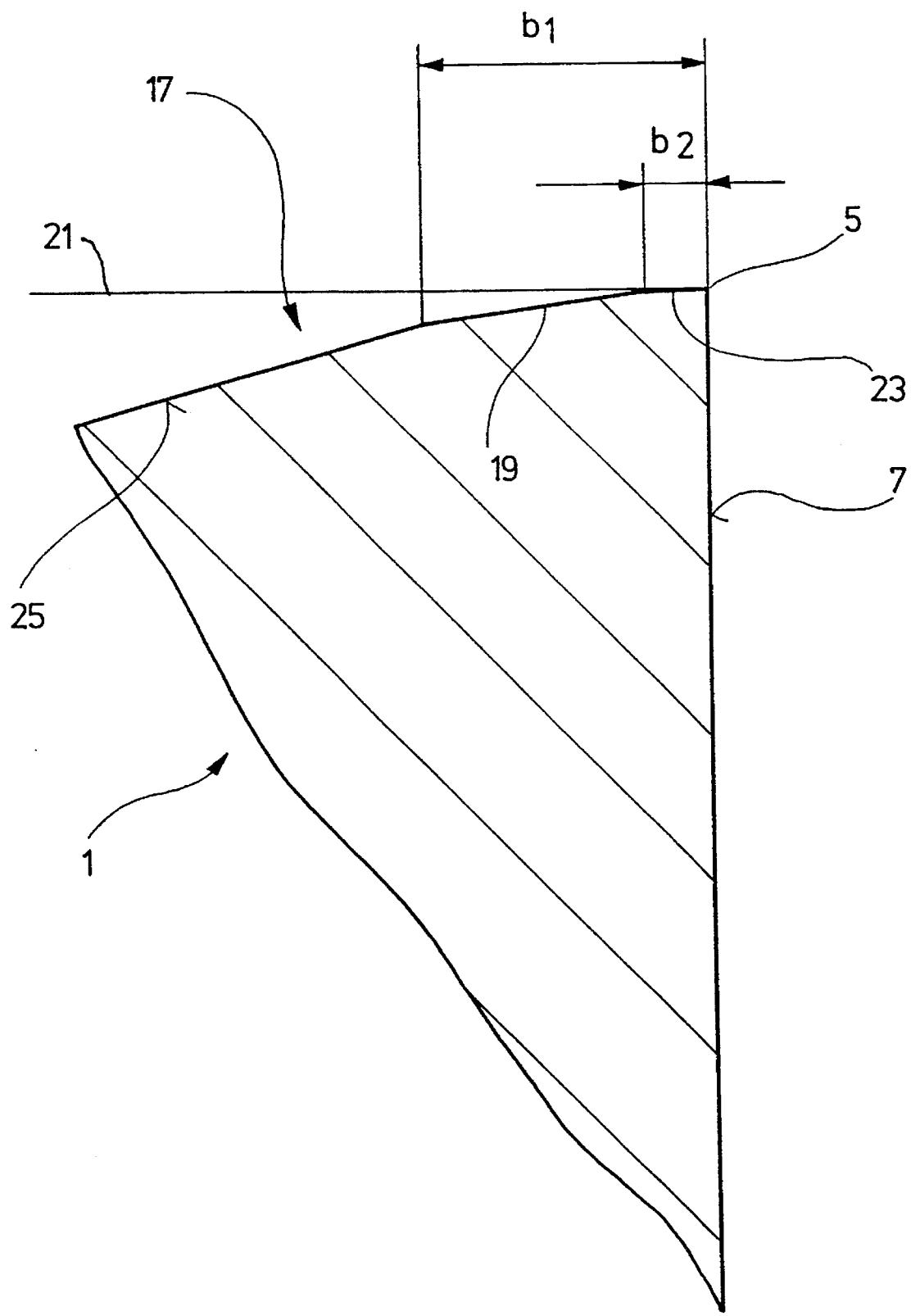
FIG. 3 is an increased scale view of a cutting edge of the tip shown in FIGS. 1 and 2.

FIG. 1 shows a topic view of a face 7 of a substantially rectangular reamer tip 1. The upper righthand chamfer corner defines a main cutting edge 3, which is adjoined by an auxiliary cutting edge 5 extending along a longitudinal edge of the tip 1. The tip 1 is so secured in the reamer body, that the main cutting edge starts machining of a bore first. The finish machining is effected with the auxiliary cutting edge 5. During machining of a bore with the tip 1, the cut off chips have a thickness of about 0.15 mm.

The tip 1 shown in FIG. 1 is a reversible tip. That is, another main cutting edge 3' is provided diagonally opposite the main cutting edge 3, which is adjoined by a respective auxiliary cutting edge 5'. When the main and auxiliary cutting edges 3 and 5 wear, the tip 1 an be turned by 180°, and machining can be effected with the previously no used main and auxiliary cutting edges 3' and 5'.

A substantially V-shaped indentation 9 is formed in the face 7 of the tip 1. Line 11 designates the deepest spot of the indentation 9. A clamp (not shown) for securing the tip in a tip-receiving groove formed in the reamer circumference, engages in the indentation 9 in per se known manner. For clarity sake, chip guiding surfaces, which extend along the longitudinal edges 13 and 13' of the tip 1, are not shown in FIG. 1.

FIG. 2 shows a schematic cross-sectional view of the tip 1 shown in FIG. 1. As shown in FIG. 2, the width of the face 7 of the tip 1 is greater than the width of the base 15. The auxiliary cutting edges 5 and 5' are adjoined by flanks 17 and 17', respectively. As can be seen in FIG. 2, the tip cross-section is substantially trapezoidal.

FIG. 3 shows, at an increased scale, a region of the tip 1 in the area of the auxiliary cutting edge 5. The view shown in FIG. 3 makes it clear that the flank 17 has several regions.

The first flank region 19 extends leftward from the auxiliary cutting edge 5 and is inclined at an angle of about 7° with respect to an imaginary horizontal line 21. The first flank region 19 does not extend up to the auxiliary cutting edge 5. It is the second flank region 23 that adjoins the auxiliary cutting edge 5. The inclination angle of the second flank region 23 to the horizontal line 21 is much smaller than the inclination angle of the first flank region 19 and lies within a range of 0.5°–1.5°, and is preferably about 1°.

The first flank region 19 is adjoined by a third flank region 25 that is inclined to the horizontal line 21 at an angle of about 15°.

From FIG. 3, it is clear that the auxiliary cutting edge 5 is defined by a line of intersection of two planes one of which coincides with the face 7 and the other of which coincides with the second region 23 of the flank 17.

The width $b_2$ of the second flank region 23 which is measured from the auxiliary cutting edge 5, lies in the range of 0.06–to maximum 0.1 mm and, preferably, is 0.08 mm.

The total width $b_1$ of the first flank region 19, which is measured likewise from the auxiliary cutting edge 5, lies in a range of 0.8–1 mm and includes the width b of the second flank region.

Figure 4:
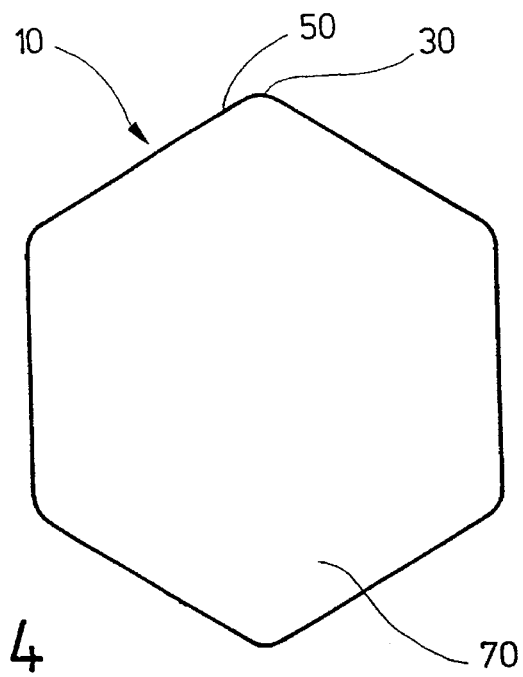
FIG. 4 is a schematic top view of a face of a second embodiment of a reamer tip according to the present invention.

FIG. 4 shows a top view of a face 70 of a tip 10 according to another, second embodiment of the present invention. The tip 10 shown in FIG. 4 is formed as a hexagon. In the region of each corner, there is provided a main cutting edge 30 and an auxiliary cutting edge 50 adjoining the main cutting edge 30. Thus, the reamer tip 10 shown in FIG. 4 has six main cutting edges and six auxiliary cutting edges. There may be provided on the face 70 of the tip 10 several indentations for securing the tip 10 in a tip-receiving groove of a reamer.

The flanks located adjacent to respective auxiliary cutting edges 50 are identical to those described with reference to and shown in FIG. 3. That is the auxiliary cutting edge is adjoined by a second flank region having a back angle of about 1°, with a first flank region adjoining the second flank region and having a back angle of about 7°, and with a third flank region adjoining the first flank region and having a back angle of about 15°.

Figure 5:
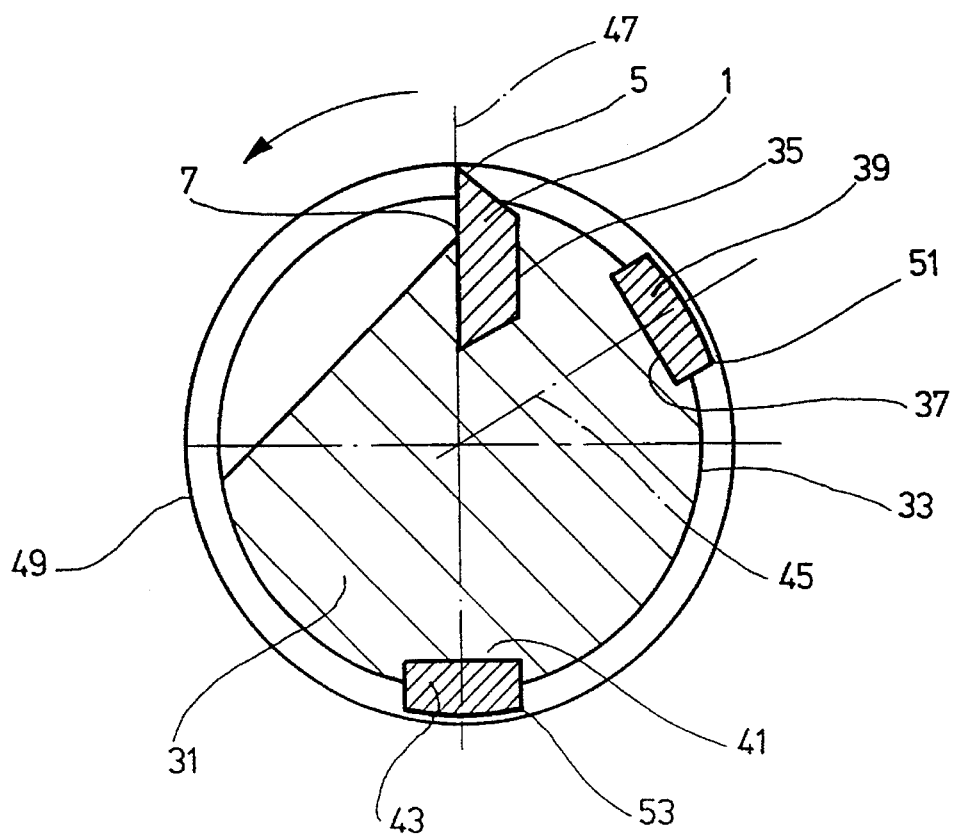
FIG. 5 is an end cross-sectional view of a one-tip reamer.

FIG. 5 shows an end cross-sectional view of a reamer 31 provided, in its circumference 33, with a first groove 35 for receiving the tip 1, a second groove 37 for receiving a first guide 39, and a third groove 41 for receiving a second guide 43. An imaginary axis 45, which passes through the first guide 39, forms with an imaginary perpendicular 47 and angle of about 40°. It is to be noted that the second guide 43 lies diametrically opposite to the tip 1.

During machining of a bore, the reamer 31, shown in FIG. 5, is rotated in a counter clockwise direction indicated by an arrow, with the main and auxiliary cutting edges 3 and 5 effecting the cutting.

During the rotation of the reamer 31, the outer edge of the tip 1 follows a so-called flight circle 49, the diameter of which is greater than the diameter determined by outer surfaces of the guides 39 and 41. That means that the tip 1 projects from the circumference of the reamer 31 in a radial direction further than the outer surfaces of the guide 39 and 43.

During machining of a bore, forces, which are applied to the reamer in the areas of the main and auxiliary cutting edges 3 and 5, cause a rocking movement of the reamer 31, which results in a contact of the edges 51 of the first guide 39 and the edges 53 of the second guide 43 with the wall surface of the machined bore. The edges 51 and 53 are formed as rounded areas, so that no damage of the bore wall surface results from the contact of the edges 51 and 53 therewith. During the rocking movement of the reamer 31, the face 7 is pivoted relative to the perpendicular 47 so that the flank 17 approaches more closely toward the wall of the machined bore. From the foregoing, it should follow that the shape of the flank 17 is so selected that no contact of the flank 17 with the bore wall takes place so that no damage of the wall surface occurs.

In this regard, the second flank region 23 acts as a quasi stop and, at the same time, as an additional guide for the reamer 31. Thus, the reamer 31 is guided in the bore, an one hand, by the second flank region 23 and, on the other, by guides 39 and 43. The second flank region 23 forms a precisely defined stop surface of the tip 1. This holds true when the tip 1 is formed as a hexagon shown in FIG. 4.

The specific guide means for the reamer 31 discussed above insures an optimal movement of the reamer 31 into a machined bore, which results in an excellent bore geometry and high quality of the bore surface.

The reamer is inserted into the bore very smoothly, and the initial wear is reduced to a minimum. This permits to determine the projection of the cutting edge from the reamer circumference without a need to take into consideration the initial wear, as it was required previously. The reduction of the length of the projection of the cutting edge results in reduction of the rocking movement of the reamer 31 in the bore. This likewise improves the bore geometry and the quality of the bore surface.

The reduction in the initial wear of the tip 1 is insured, at least in part, by the specific shape of the tip flank, which also results in a possibility to eliminate the need in the adjustment of the reamer during machining operation. The outer diameter of the reamer is determined by the active cutting edge of the tip 1 and the guide 43 received in respective grooves in the body of the reamer 31.

Figure 6:
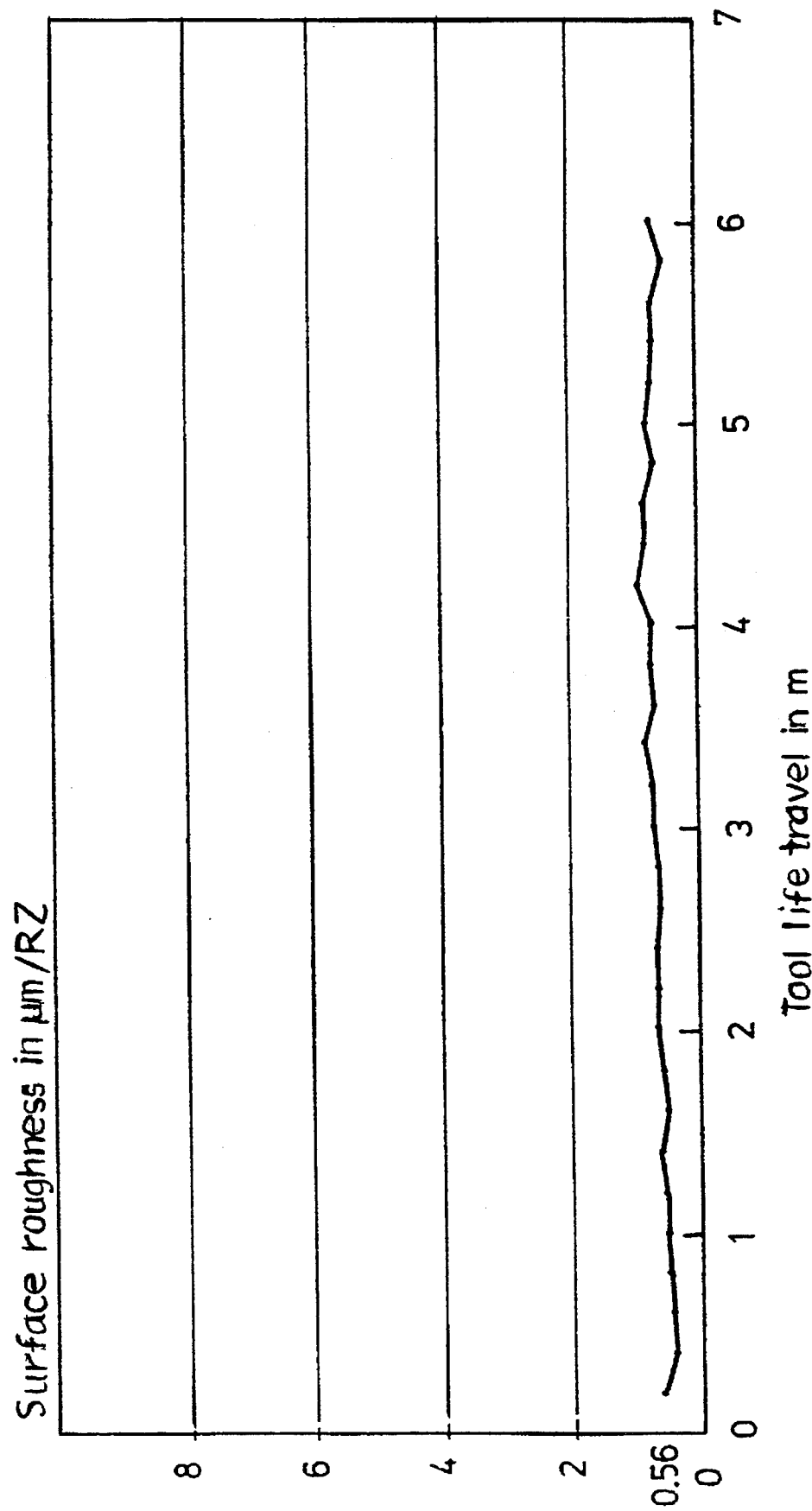
FIG. 6 is a diagram showing the roughness of the surface, machined with a reamer with a tip according to the present invention, relative to the reamer life travel.

The advantages achieved by the present invention will be discussed with reference to FIG. 6, which shows a diagram defining the surface roughness RZ in μm relative to the tool life travel in m. FIG. 6 shows that, with the reamer life travel 6 m, the bore surface remains practically smooth. FIG. 6 also shows that after the first insertion of the reamer 31, that is during the reamer travel from about 1 m to the reamer life travel length of 6 m practically no significant changes occur in the surface roughness.

Figure 7:
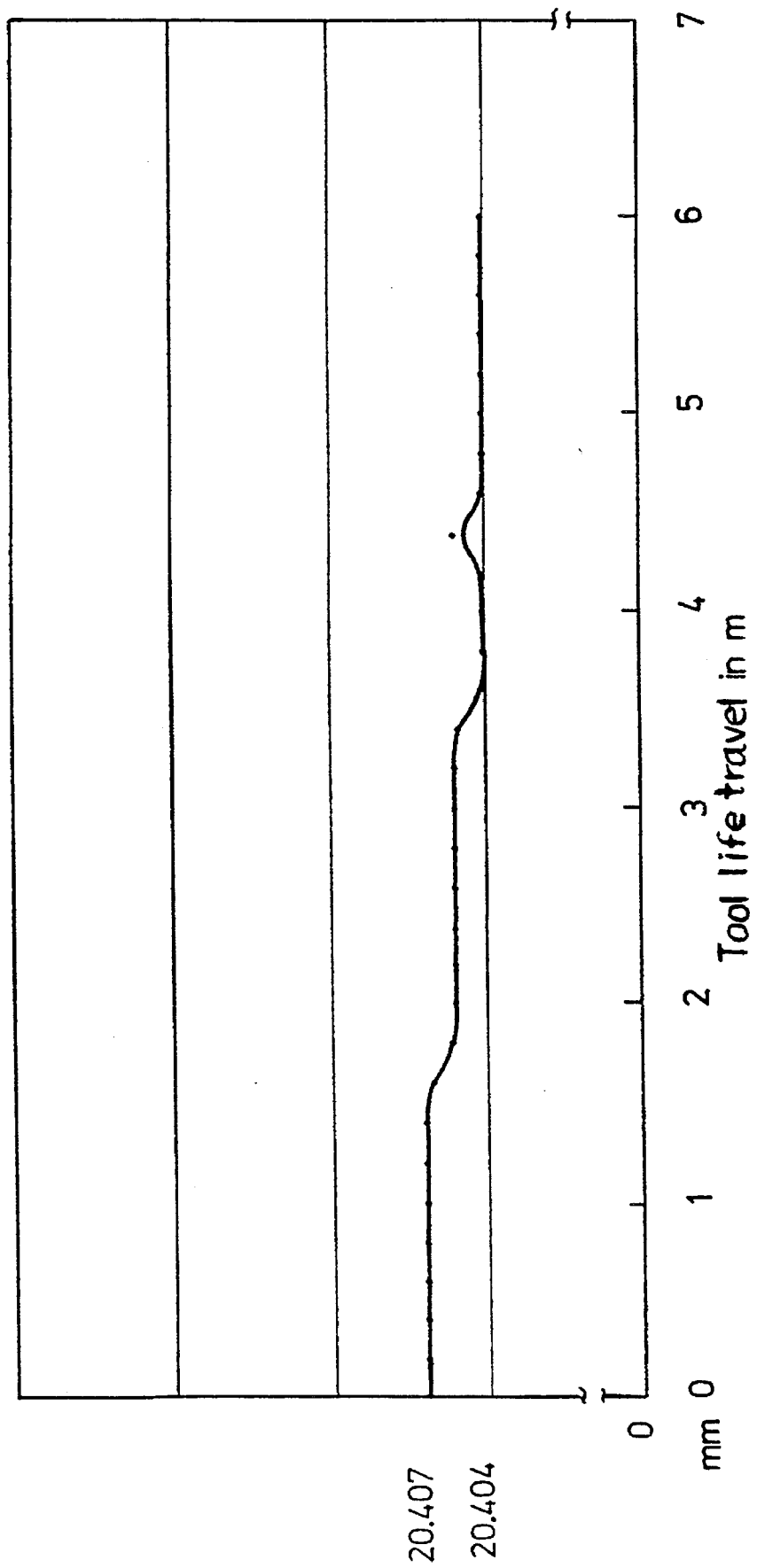
FIG. 7 is a diagram showing the variation of a bore diameter of a bore, machined with a reamer with a tip according to the present invention, relative to the reamer life travel.

The same results are achieved with respect to the bore diameter, which would be explained with reference to FIG. 7. FIG. 7 shows a diagrams showing changes of the bore diameter relative to the tool life travel in m. FIG. 7 shows that the bore diameter, during the entire reamer life travel is reduced from, e.g., a predetermined value of 20.407 mm to 20.403 mm. This results from the absence of initial wear of the reamer during its first insertion.

Figure 8:
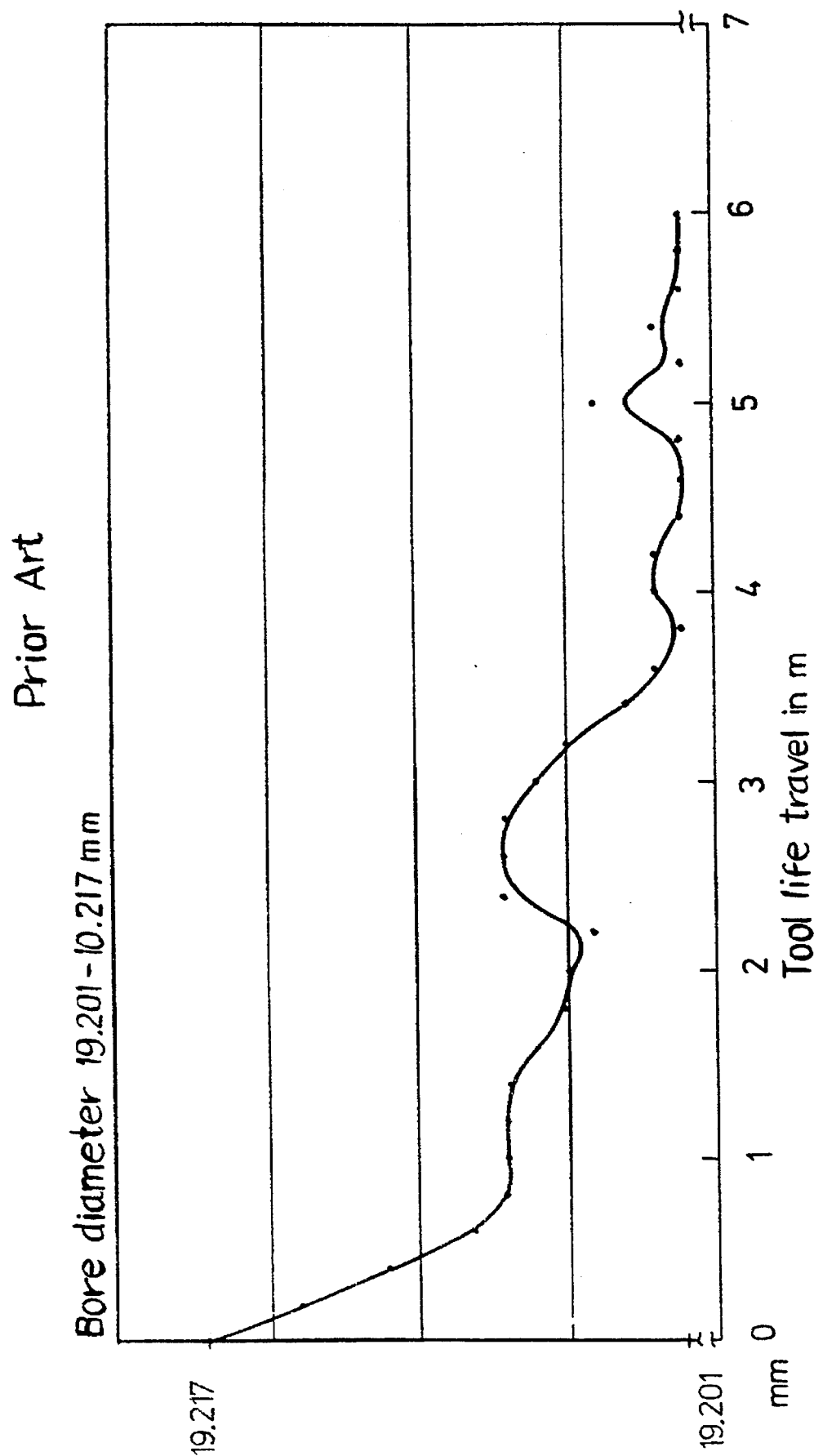
FIG. 8 is a diagram showing the variation of a bore diameter, machined with a conventional reamer, relative to the reamer life travel.

FIG. 8 which shows a diagram of the dependency of the variation of the bore diameter on the tool life travel, when the bore is machined by a reamer of the prior art, FIG. 8 shows a significant reduction in the bore diameter for the reamer life travel of 6 m. In FIG. 8, the influence of the initial wear is clearly visible. The wear is clearly noticeable after the reamer travel of 1 m and, as a result, the adjustment of the outer diameter of the tool becomes absolutely necessary.

The comparison of FIGS. 7 and 8 makes absolutely clear that shaping of the reamer flank according to the invention practically prevents the initial wear of the reamer, with the wear remaining substantially uniform during the entire life travel of the reamer.

It should be clear that a reamer can be provided with a plurality of tips arranged one after another in the direction of the reamer longitudinal axis. The plurality of tips can be associated with the two guides in a manner shown in FIG. 5.

It is also possible to form a stepped reamer provided with a plurality of tips for machining stepped bores, with the tips formed according to the present invention.

In all cases, the same phenomenon is observed, namely, the initial wear, which is observed in conventional reamer by the end of 1 m travel is absent in the reamers with the inventive tip, and the wear of the inventive tip remains substantially the same during reamer travel from 1 m to 6 m. In all cases, when the inventive tip is used, the second flank region of the tip, adjacent to the auxiliary cutting edge, serves as an additional reamer guide. This insures an optimal stabilization of the reamer in the machined bore. Because the geometry of the inventive tip practically eliminates the initial wear, the projection length of the active cutting edge relative to the outer surfaces of the guides can be reduced to a minimum which in turn reduces to a minimum the reamer rocking movement. This results in an excellent geometry of the bore and in the high quality of the bore surface.

Though the present invention was shown and described with reference to the preferred embodiments, various modification thereof will be apparent to those skilled in the art and, therefore, it is not intended that the invention be limited to the disclosed embodiments and details thereof, and departure may be made therefrom within the spirit and scope of the present invention as defined in the appended claims.

What is claimed is:

1. A reamer tip, comprising:
   a first main cutting edge and a first auxiliary cutting edge adjoining the first main cutting edge; and
   a flank provided in a region of the first main and auxiliary cutting edges and including a first inclined flank region having a first back angle of about 7°, and a second inclined flank region directly adjoining the first auxiliary cutting edge, extending from the first auxiliary cutting edge to the first flank region, and having a second back angle substantially smaller than the first back angle.

2. A reamer tip as set forth in claim 1, wherein the second back angle of the second flank region is in a range of 0.5–1.5°.

3. A reamer tip as set forth in claim 2, wherein the second back angle is about 1°.

4. A reamer tip as set forth in claim 1, wherein the second flank region has, in a direction transverse to the auxiliary cutting edge, a width in a range of 0.06–0.1 mm.

5. A reamer tip as set forth in claim 4, wherein the width is about 0.8 mm.

6. A reamer tip as set forth in claim 1, wherein the flank has a third inclined flank region adjoining the first flank region and having a third back angle substantially bigger than the first back angle.

7. A reamer tip as set forth in claim 6, wherein the third back angle is about 15°.

8. A reamer tip as set forth in claim 1, further comprising a second main cutting edge located diametrically opposite to the first main cutting edge and a second auxiliary cutting edge adjoining the second main cutting edge, the first and second auxiliary cutting edges extending along respective longitudinal edges of the tip.

9. A reamer tip as a set forth in claim 1, wherein the tip has a rectangular shape, and the first auxiliary cutting edge extends along a longitudinal edge of the tip.

10. A reamer tip asset forth in claim 1, wherein the tip is formed as a polygon with each angle thereof defining a main cutting edge, which is adjoined by a respective auxiliary cutting edge.

11. A reamer tip as set forth in claim 10, wherein the polygon is a hexagon.

12. A reamer, comprising:
   a body having a first groove and two second grooves formed in a body circumference;
   a tip received in the first groove and having a main cutting edge, an auxiliary cutting edge adjoining the main cutting edge, and a flank provided in a region of the main and auxiliary cutting edges and including a first inclined flank region having a first back angle of about 7°, and a second inclined flank region directly adjoining the auxiliary cutting edge, extending from the auxiliary cutting edge to the first flank region, and having a second back angle substantially smaller than the first back angle; and
   two guides received in the two second grooves respectively.

* * * * *